UNITED STATES PATENT OFFICE.

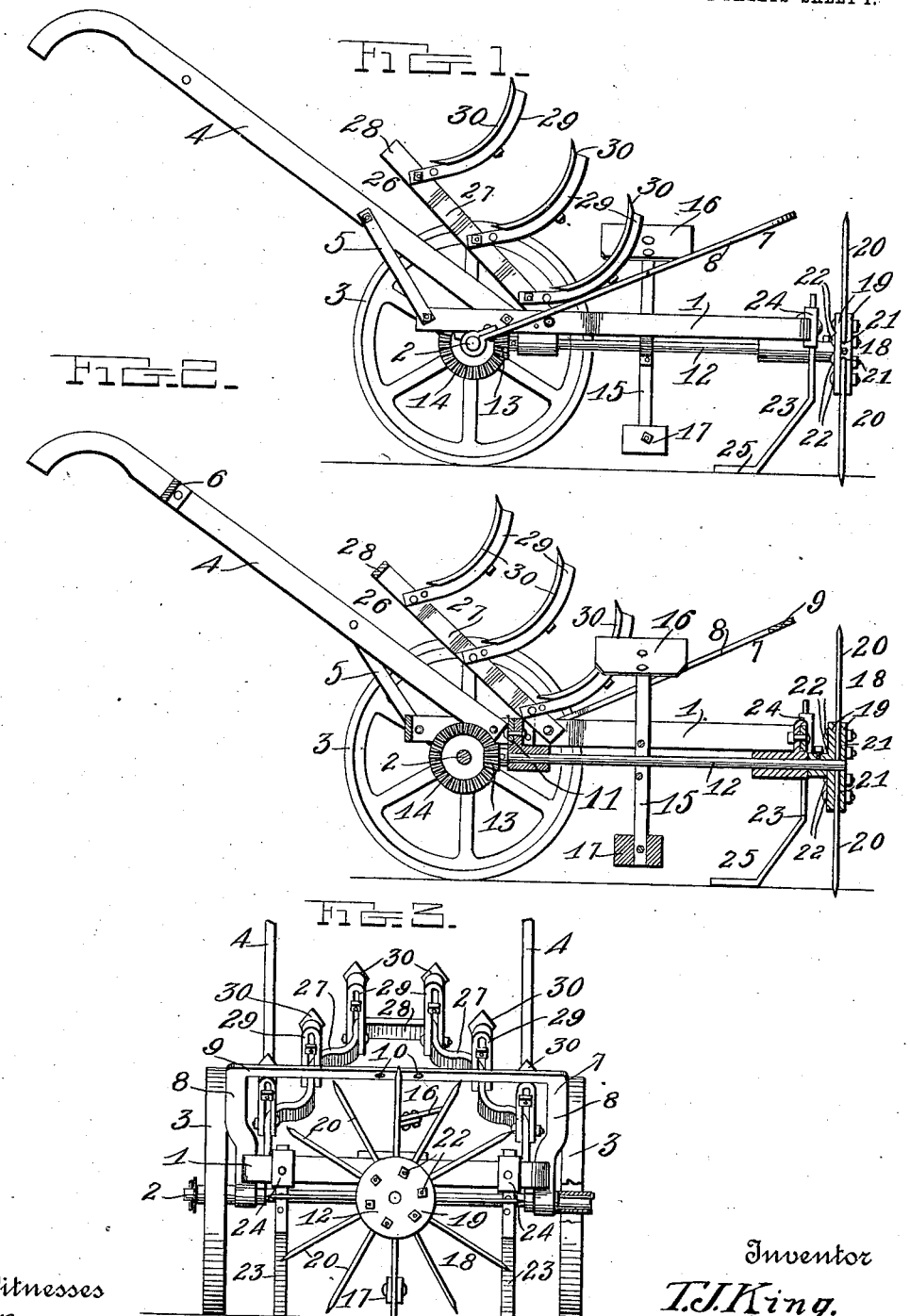

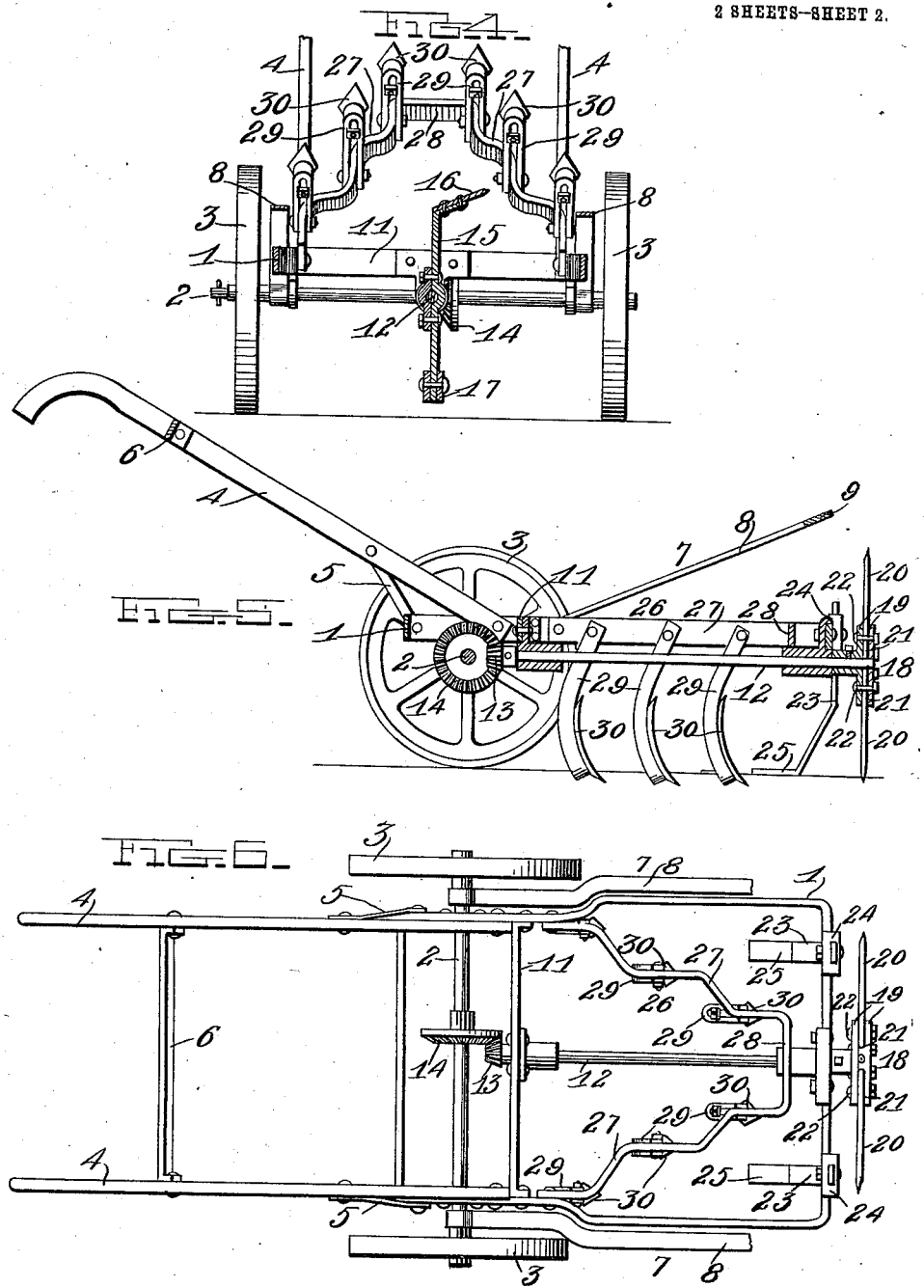

THOMAS JOEL KING, OF RICHMOND, VIRGINIA.

COMBINED COTTON CHOPPER, CULTIVATOR, AND WEEDER.

996,772. Specification of Letters Patent. Patented July 4, 1911.

Application filed December 24, 1910. Serial No. 599,119.

*To all whom it may concern:*

Be it known that I, THOMAS JOEL KING, a citizen of the United States, residing at Richmond, in the county of Henrico and State of Virginia, have invented certain new and useful Improvements in Combined Cotton Choppers, Cultivators, and Weeders; and I do declare the following to be a full, clear, and exact description of the invention, such as will enable others skilled in the art to which it appertains to make and use the same.

This invention relates to improvements in combined cotton choppers, cultivators and weeders.

One object of the invention is to provide a machine of this character having in combination with the chopping mechanism, means for effectually thinning out the stands or blocks of plants and for thoroughly mulching the ground around and close to the plants and removing the grass and weeds simultaneously with the chopping operation or when the plants are cultivated.

Another object is to provide an improved means whereby the draft is applied to the machine without in any way affecting the chopping, weeding or cultivating operations.

Still another object is to provide an improved means for adjustably supporting the chopping, weeding and cultivating mechanism whereby these parts may be regulated to work at the desired depth and means whereby said parts may be instantly lifted above the ground when desired.

A further object is to provide a device of this character which may be quickly and easily converted into a straddle row cultivator for use wherever a cultivator of this character may be employed.

With the foregoing and other objects in view, the invention consists of certain novel features of construction, combination and arrangement of parts as will be more fully described and particularly pointed out in the appended claims.

In the accompanying drawings: Figure 1 is a side view of the machine arranged as a cotton chopper and weeder, with the inner supporting wheel removed; Fig. 2 is a central vertical longitudinal section; Fig. 3 is a front end elevation; Fig. 4 is a vertical cross section taken on a line with the chopping hoes; Fig. 5 is a central longitudinal sectional view of the machine arranged as a cultivator; Fig. 6 is a top plan view thereof.

Referring more particularly to the drawings, 1 denotes the main supporting frame of the machine, said frame being preferably of rectangular form. Revolubly mounted in suitable bearings on the rear portion of the frame 1 is a supporting shaft 2 on the ends of which are fixedly mounted supporting and operating wheels 3. Connected to the rear portion of the frame are rearwardly extending handles 4 whereby the machine is guided and controlled. The handles 4 are braced to the supporting frame by inclined brace bars 5 and are connected together near their outer ends by a bar 6.

Loosely connected at its inner ends to the shaft 2 between the wheels 3 and the adjacent sides of the frame 1 is a draft frame 7 comprising side bars 8 connected together at their forward ends by an integral cross bar 9 having formed therein bolt holes 10 whereby a clevis or other suitable draft connection (not shown) may be secured to the frame. By providing the draft frame 7 and connecting the same to the shaft or axle of the machine in the manner described the draft will be directly from the shaft and will not interfere in any manner with the various operations of the machine.

Revolubly mounted in suitable bearings on the front cross bar of the frame 1 and on a cross bar 11 arranged in the rear portion of the frame 1 is a central longitudinally disposed hoe and weeder operating shaft 12 having on its inner end a bevel gear pinion 13 which is adapted to mesh with a bevel gear 14 fixed on the driving and supporting shaft 2 whereby the motion of said shaft will be imparted to the shaft 12. Detachably secured to the shaft 12 in the forward portion of the frame 1 is the standard or supporting bar 15 of a chopping hoe 16 which is secured to one end of the standard as shown. The opposite end of the standard projects a suitable distance beyond the shaft and has fixedly mounted thereon a counter balancing weight 17.

Fixedly mounted on the outer end of the shaft 12 is a weeding wheel 18 which comprises a hub consisting of a pair of clamping plates 19 between which are clamped a series of radially projecting weeding fingers 20 having pointed outer ends which are adapted to engage the ground to a sufficient depth for breaking up the top crust of the same and removing grass or weeds and thinning out the stands or blocks of plants. One of the plates 19 of the hub has formed therein a series of radially disposed recesses 21 with which the inner ends of the fingers 20 are engaged and held apart in spaced relation, said ends of the fingers being secured in the recesses by the outer plate of the hub which is clamped into engagement therewith by a series of clamping bolts 22 arranged through the hub as shown. By thus fixedly mounting the chopping hoe and weeding wheel on the shaft 12, said hoe and wheel will be simultaneously revolved and driven by the shaft 12 when the machine is drawn over the ground. By this means it will be seen that the weeding operation may be carried on simultaneously with the chopping operation.

In order to support the outer end of the machine and thus cause the hoe and weeding wheel to operate at the desired depth I provide frame supporting runners 23 which are preferably in the form of flat metal bars having vertically disposed upper ends and which are adjustably secured to the front cross bar of the frame 1 by suitable clips 24 whereby the runners may be raised and lowered thus supporting the frame at the desired elevation. The lower portion of the runner bars 23 are bent rearwardly at an angle and have their lower extremities bent rearwardly to form ground engaging members 25 which engage and slide over the ground as the machine is drawn along thereby preventing the hoe or the weeding wheel from cutting below the desired depth.

In addition to the chopping and weeding devices the machine is also provided with a cultivating mechanism comprising a supporting frame 26 consisting of side bars 27 which are connected together at their outer ends by an integral cross bar 28. The frame 26 increases in width from its forward or outer end toward the rear end thereof and the side bars 27 of the frame are preferably constructed in the form of compound curves and have their inner ends pivotally secured to the side bars of the frame 1 as shown. To the side bars 27 of the frame are secured the upper ends of a series of standards 29 which are preferably in the form of flat bars bent or folded upon themselves and curved forwardly at their lower ends. To the lower ends of the standards are bolted or otherwise adjustably secured a series of cultivator teeth 30 which are adapted to engage the ground on the opposite sides of the rows of plants and to thoroughly work the soil which has been previously mulched by the weeding wheel.

By pivotally connecting the cultivator frame 26 in the rear portion of the main frame 1 said cultivator frame may be swung upwardly or downwardly to operative and inoperative positions as shown in the drawings. When the chopping hoe 16 is being used the cultivator frame will be swung upwardly and rearwardly as shown in the first figures of the drawing and when it is desired to use the machine as a cultivator the chopping hoe is removed and the cultivator frame swung downwardly to an operative position.

If desired the weeding wheel may be employed in connection with the cultivator or removed from the shaft. When used with the cultivator the wheel will effectually break up the ground close around and in between the plants so that the cultivating shovels may complete the work of cultivating along the sides of the rows without danger of uprooting or disturbing the plants by turning up large crusts or lumps of soil when the latter has become baked as frequently occurs in the use of the ordinary form of cultivator unless the ground around the plants has been previously hoed. It will thus be seen that when the weeding wheel is employed in connection with the cultivator that the cultivating and weeding operations are simultaneously performed.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a machine of the character described, a rectangular main supporting frame, a combined supporting and driving axle revolubly mounted on said frame, supporting and operating wheels mounted on the outside of the frame on said shaft, a longitudinal shaft revolubly mounted in the frame and geared to said driving and supporting shaft, rotary cultivating implements on said shaft, runners adjustably connected to said frame whereby the latter is adjustably supported to cause said rotary implements to operate at the desired depth and a cultivating mechanism comprising a frame pivotally mounted at its rear end in the main frame and carrying cultivators, and adapted to be used interchangeably with said rotary implements.

2. In a machine of the character described, a main supporting frame, a combined supporting and driving shaft revolubly mounted on said frame, supporting and operating wheels mounted on the ends of said shaft, a hoe and weeding wheel shaft revolubly mounted on the frame and geared to said driving and supporting shaft, a chopping hoe detachably secured to said shaft, a weeding wheel mounted on the outer end of the shaft, runners adjustably connected to said frame whereby the latter is adjustably supported to cause said hoe and weeding wheel to operate at the desired depth, a draft frame loosely connected at its inner ends to the outer ends of said supporting shaft outside the frame whereby the draft of the machine may be applied directly to said shaft and thereby prevented from interfering with the operations of the machine, a cultivator mechanism comprising a frame pivotally mounted in said main frame carrying cultivator blades and adapted to be swung upwardly into inoperative and downwardly into operative positions for use interchangeably with said chopping hoe.

3. A machine of the character described comprising a rectangular main supporting frame, an axle-shaft journaled in the side bars thereof, wheels on the axle shaft outside of the frame, a U-shaped draft frame having the rear ends of its legs pivotally mounted on the axle-shaft between the main frame and the wheels, handles secured to the side bars of the main frame, braces connecting the side bars and handles, bearings on the front and rear bars of the main frame, a longitudinal shaft journaled in said bearings and projecting beyond the front of the frame, gears connecting the axle shaft and the longitudinal shaft, rotary cultivating implements secured to the longitudinal shaft, means for adjusting the height of the forward end of the main frame, and a frame carrying cultivator blades, pivotally mounted in the main frame for use interchangeably with some of said rotary implements.

In testimony whereof I have hereunto set my hand in presence of two subscribing witnesses.

THOMAS JOEL KING.

Witnesses:
C. H. WALLINGER,
S. H. HANCOCK.

---

Copies of this patent may be obtained for five cents each, by addressing the "Commissioner of Patents, Washington, D. C."